United States Patent Office 3,512,121
Patented May 12, 1970

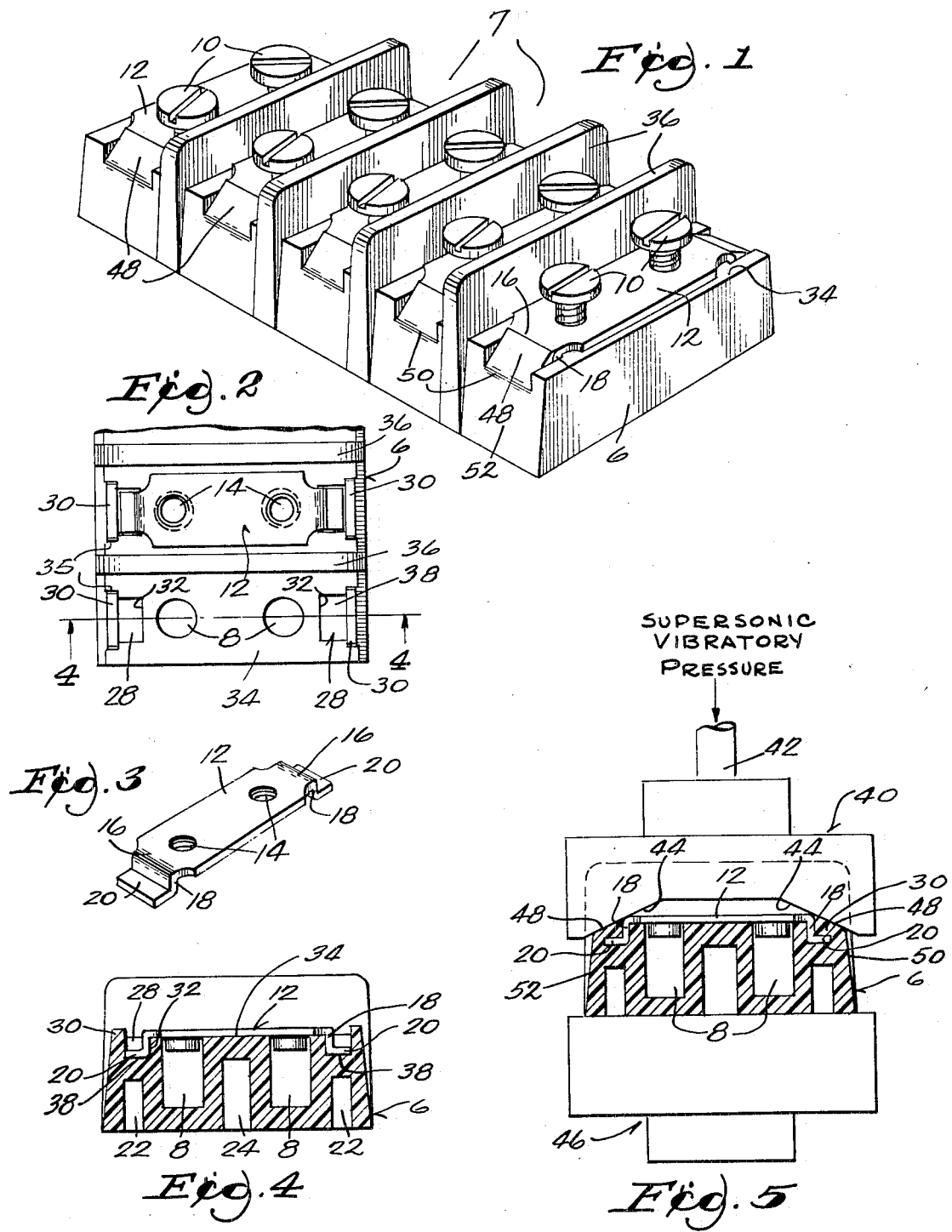

3,512,121
TERMINAL BLOCK AND METHOD OF
MANUFACTURE THEREOF
Bruce A. Bergeron, Milwaukee, Wis., assignor to Curtis Development & Mfg. Co., Milwaukee, Wis., a corporation of Wisconsin
Filed Sept. 11, 1967, Ser. No. 666,592
Int. Cl. H01r 9/10, 9/16
U.S. Cl. 339—198                                    4 Claims

ABSTRACT OF THE DISCLOSURE

A terminal plate with offset anchoring flanges at its ends, is permanently and unitarily fixed to a plastic terminal block by supersonic swaging which softens and deflects integral plastic portions of the block to overlie the offset anchoring flanges at the ends of the plate, leaving such deflected portions with surfaces extending to and merging with the top.

Background of the invention

The present procedure represents what is believed to be a new application of supersonic tools. Conventionally these have been used to weld or fuse plastic parts to each other or to head a plastic peg to engage it in the manner of a rivet with a metal part having an aperture through which the peg extends. It has also been used to fix a metal insert in the aperture of a plastic part. An example of fusion in this manner will be found in U.S. Pat. 3,224,916.

In contrast, the supersonic tool is used in the instant invention to displace or deflect laterally an integral portion of a preformed block of synthetic resin to mold or deform portions of the block over a recess in which an anchoring leg of a metal plate has been positioned. The block becomes molded across the anchoring leg to merge smoothly with the face of the plate from which the leg projects.

As compared with previous manufacture of terminal blocks for electrical connections, the technique herein disclosed results in great savings by eliminating parts and operations and it produces a product with refined outlines and one which is easy to use.

Summary of the invention

The invention has both method and product aspects. From a method standpoint, the invention comprises the swaging of portions of a terminal block of moldable synthetic resin to soften and deform these to positions in which integral portions of the block overlie anchoring portions of the electric terminal plate or the like to produce a compact unitary structure. From a product standpoint, the invention contemplates a unitary assembly of a plastic terminal block and a metal terminal plate, the latter having offset anchorage feet at its ends and the block having integral portions overlying such feet and provided with oblique surface portions merging smoothly with the surface of the plate.

Brief description of the drawings

FIG. 1 is a view in perspective of a terminal block produced according to the invention.

FIG. 2 is a fragmentary detail view in plan of a portion of a prefabricated block with a plate positioned in one pocket, an empty pocket being shown for reception of another plate.

FIG. 3 is a view in perspective of a separately fabricated terminal plate adapted to be received into the empty pocket of the terminal block shown in FIG. 2.

FIG. 4 is a view taken in section on the line 4—4 of FIG. 2 showing the plate of FIG. 3 in position in the empty pocket of the block shown in FIG. 2.

FIG. 5 is a diagrammatic view showing the application of a supersonic swaging tool to swage portions of the block shown in FIG. 4 about the anchoring leg portion of the plate therein illustrated.

Description of the preferred embodiment

In prefabricated block 6 having separate terminal-receiving pockets 7, clearance holes 8 are provided in each pocket for terminal screws 10 threaded into the separately fabricated plate 12. The plate has tapped openings at 14 to receive these screws. At its ends, the plate has narrowed extremities 16 from which anchorage leg portions 18 extend downwardly to respective oppositely projecting feet 20. The openings 22 at 24 in the bottom of the block reduce the volume of plastic required in the molding thereof and are a convenience from the standpoint of manufacture.

At each side of the block, each pocket 7 is provided with a recess 28 having as its external wall a flange 30 and having as its internal wall a shoulder 32 abutted by an anchorage leg 18 of terminal plate 12. Slits 35 at the ends of flanges 30 free these from direct connection with those portions of the block which provide the flat surfaces 34 upon which the several plates rest. Assuming that the block is made to receive a plurality of terminal plates, as shown in FIG. 1, pocket-separating partitions 36 integral with the prefabricated block are used to segregate respective pockets to minimize accidental cross-contact between terminals.

The dimensions of the parts are such that when the terminal plate 12 is placed in a pocket upon one of the flat surfaces 34 as best shown in FIGS. 1, 2 and 4, the anchorage legs 18 of the terminal plate extend into respective pockets 28 and preferably rest on the bottom surfaces 38 thereof.

The block is now subjected to pressure of a supersonically vibrated swaging tool or head 40 (FIG. 5) which has a stem 42 connected to a conventional supersonic vibrator. This vibrates the head axially of stem 42 at a super-audible rate and thereby develops heat in the plastic parts engaged by the oblique surfaces 44 of the tool. A press (not shown) subjects the tool to pressure toward the block 6 as indicated by the legend in FIG. 5, the block being supported on the base 46. The pressure and the super-audible vibration and the resulting heat swages each of the flanges 30 over the respective anchorage foot 20 of plate 12 and against the respective anchorage leg portion 18 of the plate. The result is to flow the plastic material of the flanges 30 into the angle between the leg and foot portions of the plate and, at the same time, to form or mold the plastic to provide surfaces 48 which merge with the sides of the block and the upper surface of the plate itself in the manner clearly shown in FIG. 1 to provide a smooth and neatly finished appearance. The swaging operation tends to produce a somewhat rounded surface at 50 where the swaged flange joins the slightly outwardly convergent end surfaces 52 of the original block.

Because the legs 18 are materially narrower than the screw-receiving portion of plate 12, and because flange 30 is free at its ends, the swaged portion 48 lies well within the sides of the surface 34 which forms the seat upon which plate 12 is supported. The result is a neat, compact and highly finished unitary asembly of plate and block.

The only portion of the tool which is illustrated is the tip 40. The so-called horn and vibrator of such tools are well-known, as shown by publication references below.

The resin block may be made of a variety of materials.

Among the best are polystyrene; SAN; ABS; rubber-modified PS; and polycarbonate. Others which are acceptably good further include fibrous glass-filled PS; acetal, injection molded acrylics (cast or extruded acrylics being less good); nylon, high density polyethylene, etc. These particulars are furnished by way of example and not by way of limitation.

For further particulars, see "Modern Plastics" for November 1964, and "The Iron Age" for Apr. 8, 1965, and U.S. Pat. 3,224,916. As therein indicated, the desired frequency usually will exceed 20,000 cycles per second fed into a transducer which transforms electrical energy into mechanical vibrations. If the transducer comprises lead zirconate titanate, more than 90% of electrical energy is converted into mechanical vibrations, such vibration being applied to the work with a presure of 10 to 100 pounds. By limiting the exposure to a period on the general order of one second, preferably ranging from one-tenth second to one and one-half seconds, the heat is limited to an amount which will deform the plastic without softening it to the point that a bead is formed about the area upon which the tool operates.

The time required being very small, and the number of parts reduced to a minimum, the invention makes it possible to produce terminal blocks at minimum cost.

I claim:
1. As a new article of manufacture, a terminal block of moldable synthetic resin having a seat for a terminal plate, and a plate in unitary assembly with such block, the plate having side portions positioned on the seat and having at its ends anchorage legs and outwardly directed feet narrower than said side portions and enclosed within integral portions of such block which are each at an outside margin thereof and are narrower than said seat and overlie and enclose said feet and legs and are in substantially full face contact therewith.

2. As a new article of manufacture, a terminal block of moldable synthetic resin having a seat for a terminal plate, and a plate in unitary assembly with such block, the plate being positioned on the seat and having anchorage legs and outwardly directed feet enclosed within integral portions of such block which overlie and enclose said feet and legs, said anchorage legs of the terminal plate being disposed approximately at right angles to the plate, and the outwardly directed feet being disposed approximately in planes parallel to the plate, thereby forming angles between the respective legs and the respective feet, the said integral portions of the block which overlie and enclose the leg and feet portions of the plate substantially filling the said angles and having exposed surfaces which are oblique and which merge with the upper surface of the plate.

3. As a new article of manufacture, a terminal block having upstanding partition flanges dividing the block into terminal-receiving pockets, said block having a terminal plate seat in each such pocket, and terminal plates disposed on the respective seats and unitarily assembled with the block, each such plate having an intermediate portion extending transversely of the block and being provided at its ends with anchorage portions narrower than the seat and extending downwardly into a respective pocket and thence laterally outwardly within the block and being covered by integral outside edge portions of the block which imbed said anchorage portions, each said integral portion of the block being independently connected with the block at its outer end and thence extending inwardly in a respective pocket over one of said anchorage portions of a terminal plate.

4. As a new article of manufacture, a terminal block having upstanding partition flanges dividing the block into terminal-receiving pockets, said block having a terminal plate seat in each such pocket, and terminal plates disposed on the respective seats, and unitarily assembled with the block, each such plate having an intermediate portion extending transversely of the block and being provided at its ends with anchorgae portions extending downwardly into and thence laterally within the block and being covered by integral portions of the block which imbed said anchorage portions, the anchorage portions of the plate being of less width than intermediate portions of the plate resting on said seat, the integral portions of the block which overlie and imbed the anchorage portions of the plate having external surfaces which are oblique and merge with the sides of the block and with the upper surface of the plate.

References Cited

UNITED STATES PATENTS

| | | | |
|---|---|---|---|
| 2,099,555 | 11/1937 | Benander | 339—221 X |
| 2,768,725 | 10/1956 | Foulds et al. | 29—513 X |
| 2,134,472 | 10/1938 | Criger et al. | 176—32 |
| 3,392,361 | 7/1968 | Peavy | 339—220 X |

FOREIGN PATENTS

| | | |
|---|---|---|
| 714,549 | 12/1941 | Germany. |
| 1,036,975 | 8/1958 | Germany. |
| 935,004 | 8/1963 | Great Britain. |

RICHARD E. MOORE, Primary Examiner

U.S. Cl. X.R.

29—513; 339—218